(12) United States Patent
Borri et al.

(10) Patent No.: US 7,472,078 B2
(45) Date of Patent: Dec. 30, 2008

(54) SYSTEM FOR DISTRIBUTING FILES CONTAINING DIGITAL DATA USING A COMPUTER NETWORK

(75) Inventors: Roberto Borri, Nole (IT); Giustiniano La Vecchia, Vinovo (IT); Luciano Chiappalone, Corso Tassoni No. 79/5, Torino (IT) I-10143

(73) Assignee: Luciano Chiappalone, Turin (IT)

( * ) Notice: Subject to any disclaimer, the term of this patent is extended or adjusted under 35 U.S.C. 154(b) by 412 days.

(21) Appl. No.: 10/432,461

(22) PCT Filed: Oct. 29, 2001

(86) PCT No.: PCT/EP01/12584
§ 371 (c)(1),
(2), (4) Date: Dec. 22, 2003

(87) PCT Pub. No.: WO02/43018
PCT Pub. Date: May 30, 2002

(65) Prior Publication Data
US 2004/0083139 A1    Apr. 29, 2004

(30) Foreign Application Priority Data
Nov. 24, 2000   (EP) .................................. 00830774

(51) Int. Cl.
*G06Q 30/00* (2006.01)
*G06F 15/16* (2006.01)

(52) U.S. Cl. ............................. 705/26; 705/27; 705/50; 709/219; 709/222; 370/229

(58) Field of Classification Search .................. 705/26, 705/27, 50; 709/219, 222; 713/176; 370/229
See application file for complete search history.

(56) References Cited

U.S. PATENT DOCUMENTS

| | | | | |
|---|---|---|---|---|
| 5,077,727 A * | 12/1991 | Suzuki | ......................... | 398/75 |
| 5,802,366 A * | 9/1998 | Row et al. | .................... | 709/250 |
| 6,167,490 A * | 12/2000 | Levy et al. | .................. | 711/148 |
| 6,959,327 B1* | 10/2005 | Vogl et al. | .................... | 709/219 |
| 2003/0135464 A1* | 7/2003 | Mourad et al. | ................ | 705/50 |
| 2005/0081042 A1* | 4/2005 | Venkatesan et al. | ......... | 713/176 |
| 2005/0166056 A1* | 7/2005 | Yamanaka | ................... | 713/176 |
| 2005/0198238 A1* | 9/2005 | Sim et al. | ................... | 709/222 |

* cited by examiner

*Primary Examiner*—Yogesh C Garg
(74) *Attorney, Agent, or Firm*—Mayer & Williams PC; Mark D. Wieczorek, Esq.; Karin L. Williams, Esq.

(57) ABSTRACT

A system for distributing files containing digital data, by using a telematic network, allows the remote booking of a plurality of files, through a personal computer (12) or a cellular phone (10), the choice of a support (16) onto which said files are to be recorded, and the subsequent collection of the support at a chosen point of sale (8). Moreover, the system guarantees the quality, the origin, the safeguard of the copyrights related with the files recorded onto the support and delivered to the client, and the protection of the material against any duplication until the production and delivery of the support to the client to which the material is destined.

17 Claims, 3 Drawing Sheets

SYSTEM FOR DISTRIBUTING FILES CONTAINING DIGITAL DATA USING A COMPUTER NETWORK

The present invention relates to distribution of files containing digital data by using a telematic network.

More particularly, the invention concerns a system for distributing and storing onto a suitable support a set of files, music pieces, audio/video programs or text directly booked by a client.

The recent diffusion of electronic commerce via Internet, due to a more and more increasing diffusion of personal computers in the families, has created new commercial opportunities as far as distribution and commerce of files, music pieces, video films or texts are concerned.

In effect, commercial Internet sites are at present available through which the user can download on his/her own computer music pieces in compressed digital format (format MP3 is very widespread), or short video films, also in compressed format, text files, such as books in electronic format, or computer programs.

Indeed, such systems offer a lot of advantages to the consumer: actually he/she can choose, and then buy, only the products of interest for him/her and can create, on his/her own personal computer, a personal collection of files or music pieces.

Yet, even if those systems are very flexible and powerful, their diffusion is at present limited by a number of factors: for instance, notwithstanding the use of very advanced compression algorithms, the files being transferred still have big sizes and, at the present connection rates, demand rather long transfer times.

Moreover, the compression algorithms unavoidably impair the quality of a music piece, or of a film, so that the product bought by the consumer never has the same quality as the original piece.

The object of the invention is to provide a system for distributing and storing onto a suitable support a compilation of pieces directly chosen by a client, which system ensures at the same time the maximum flexibility and easiness of use.

Another object is to provide a system allowing, via Internet, the creation of a compilation of pieces with audio/video quality identical to that of the original piece, so that the drawbacks of the prior art are no longer present.

The above and other objects of the invention are achieved by a distribution system made in accordance with the present invention, as claimed in the appended claims.

The system made in accordance with the invention can be used for distributing any kind of digital file, while ensuring observance of the copyright laws.

The above and other objects of the invention will become more apparent from the description of a preferred embodiment, with reference to the accompanying drawings, in which.

Figure 1:
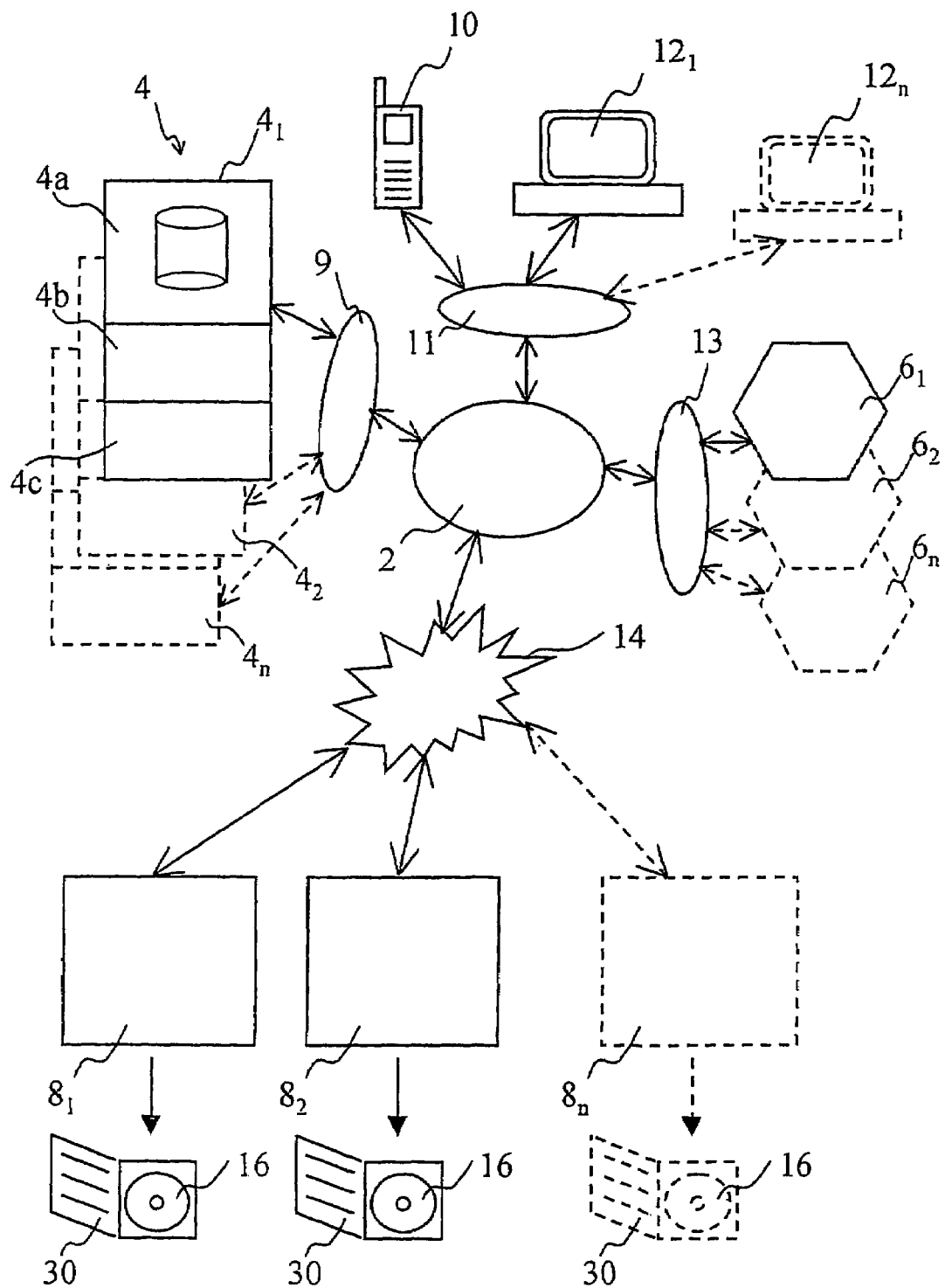
FIG. 1 is a block diagram of the architecture of the distribution system made in accordance with the present invention.

Referring to FIG. 1, a system for distributing files containing digital data by using a telematic network, such as an Internet network, a dedicated intranet network or a network comprising a plurality of interconnected networks, comprises:

- a store 4, connected to the network, where a plurality of files of different kinds and/or formats, for instance music pieces, video films, text files or computer programs, are stored; moreover several stores $4_1 \ldots 4_n$, even located in physically different locations, can be connected to the same network;
- a plurality of distribution points 8, also connected to the telematic network, for the file recording onto a suitable support 16 and the subsequent delivery to the client;
- a plurality of telematic terminals 10, 12, connected to the network, for the choice and the booking by the client of one or more files present in store 4;
- a central processor 2, connected to the telematic network and centrally managing the operations concerning the file booking through terminals 10, 12, the file transfer to a selected distribution point, and the payment of copyright fees to authority or authorities 6 owning such copyrights, as described in detail hereinafter.

The structure of the constituent parts of the above-disclosed system will be now described in detail.

Each store 4 is substantially a server computer equipped with: a high memory capacity 4a, implemented for instance by means of rigid disks or optical disks; an interface towards an acquisition network 9 connecting the store with manager 2; means 4b arranged to perform, if necessary, a format conversion on the file to be transferred; and means 4c for encoding the same file. In effect, a format conversion can be necessary, for instance in case of music pieces, from 16-bit, 44 kHz PCM standard of the CDs to MPEG2 layer 3 format (known as MP3 format).

Moreover, for security reasons, the files transferred from store 4 to the corresponding distribution point 8 are encoded in block 4c by using a personalised encoding key, such that a single distribution point, or a few distribution points in case of broadcast transmission, can receive and decode the file.

The files received at the distribution points are in fact stored into the local buffer in encoded format, so as to ensure the maximum security even in case the whole local store is fraudulently taken away.

However the system architecture applies to the distribution of any kind of data, by signalling at the booking the desired storage support and format.

A single store 4 may be provided, or the store can be subdivided into a plurality of stores $4_1 \ldots 4_n$, all having the same architecture: such stores can even be located in different locations, provided they are connected to the manager 2 through acquisition network 9.

Connection between manager 2 and distribution points 8 is established by means of a broadband network 14, e.g. an optical fibre link or a satellite link. A satellite network allows broadcasting a same file to all distribution points with a unitary cost in terms of occupied bandwidth. That opportunity may be very useful when, e.g. in the case of a system for distributing music pieces, the launch of a new successful record takes place and many requests of the same pieces at all distribution points are expected.

Distribution points $8_1, 8_2, \ldots 8_n$ are independent apparatuses, which are located for instance at a shop of music products, a bookshop or a software shop, and are equipped with a connection to broadband network 14 and with a device for recording the requested files onto a proper support.

Figure 2:
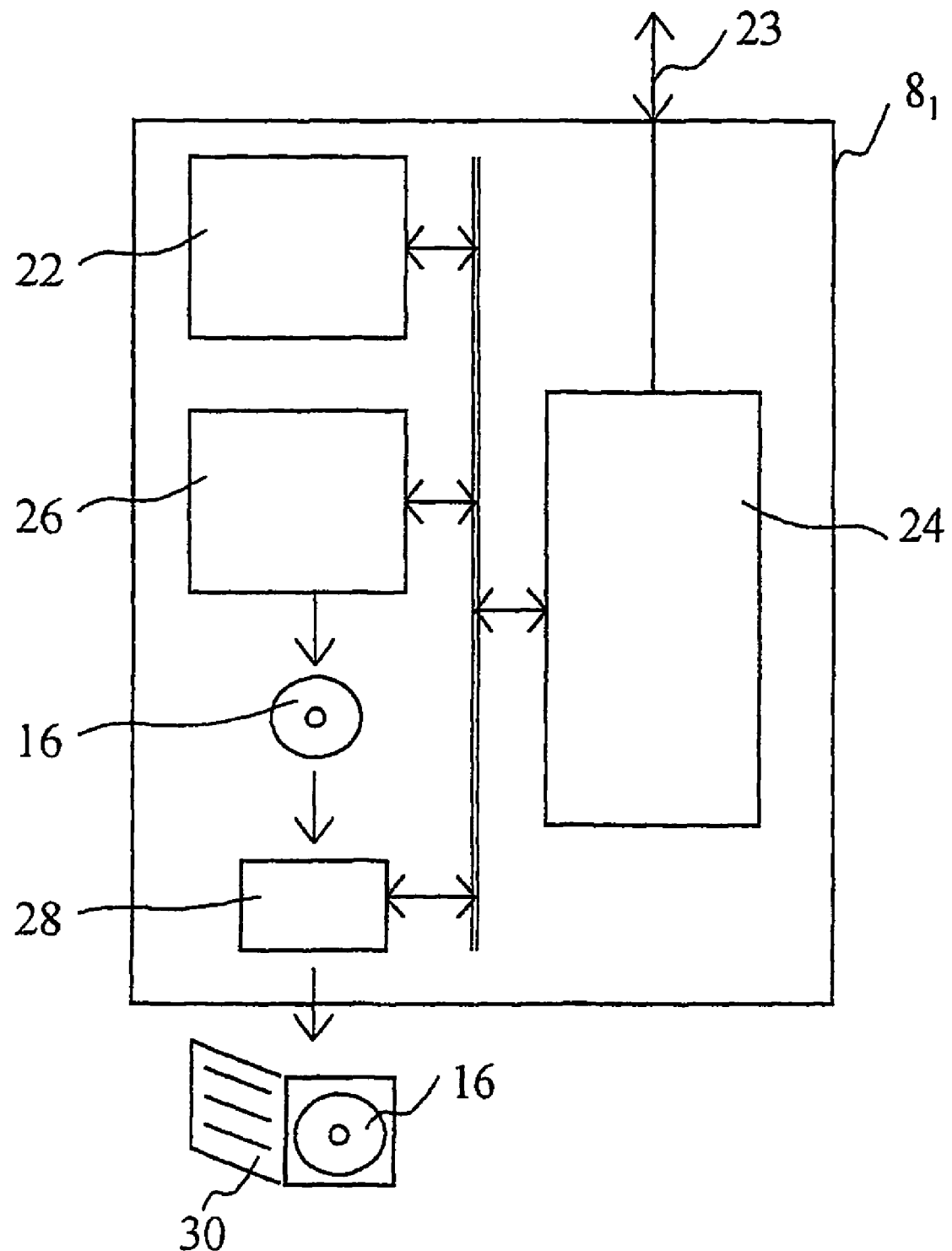
FIG. 2 is a block diagram of a detail of the system shown in FIG. 1.

FIG. 2 shows one such apparatus in detail. The core of apparatus $8_1$ is a computer 24, for instance a personal computer, coupled with: a local buffer or cache memory 22, in particular a rigid disk; a recording device 26, in the present instance a masteriser for supports like CDs and/or DVDs 16; and a device 28 for printing images and/or texts containing information concerning the recorded files and for packaging support 16 into a suitable container 30. Apparatus 8i is connected to broadband network 14 through a connection interface 23.

Cache memory 22 is an essential distinctive and optimising element of the distribution system. Local storage in effect allows dispensing with multiple transfers of a file, upon multiple consecutive requests, with clear advantages in terms of time and especially of costs, since broadband networks are at present very expensive. The operation of cache memory 22 is similar to the operation of a conventional cache memory: it accumulates data until it becomes full, and then starts eliminating the least requested files to create space for the most recently transferred files, while keeping the most requested files always available.

The distribution system, while being physically distributed, is based on a strong central control: actually, all parts are controlled by central processor 2, disclosed in detail hereinafter.

Apparatuses $8_1, 8_2, 8_n$ located at the distribution points are implemented by the system manager and controlled through central processor 2. The distributor (meaning by this term the shopkeeper) cannot interact with the apparatuses themselves in order to locally operate: thus it is impossible to copy file sets or individual files, stored for instance in cache memory 22, without a communication among the software modules installed at the distribution point, at the manager and at the owner of the file-related copyrights.

Each distribution point 8 further comprises enabling means enabling its operation only upon reception of a unique identification code (PIN) sent by central controller 2 whenever the system is activated.

Should the distributor need to use the same system to produce the material upon request from a client, he will use a user interface like terminal 12, exactly acting like a client.

Moreover apparatus 8 can also be equipped with hardware protections, like seals and anti-burglar devices, even if software protections, data encoding systems and transmission channel ciphering already ensure a global protection.

The client of the service can use, in order to gain access to the system, one of the systems and devices made available by the development of the so-called access products and technologies. For instance, access to the service is possible by using a personal computer 12 having a connection to an access network 11, for instance an Internet network, or a cellular phone equipped with WAP technology, a UMTS terminal and the like.

Moreover, by adapting the service access interfaces at the server's side, that is access network 11, it is possible to have available both conventional booking techniques, such as a simple telephone request, and more innovative technologies such as speech recognition. Actually, it is always possible to adapt the user interface while leaving the overall system functions unaffected.

Central processor 2 is a network server connected to one or more telematic networks implementing the logic functions related with the access by the user terminals for order collection (access network 11), communication to companies/authorities owning the copyrights (private network 13), access to the original files (acquisition network 9) and distribution toward production points (distribution network 14).

The server manages the whole system thanks to a suitable program, the functions of which will be now described in detail. The program can be seen as consisting of a plurality of "modules", mutually communicating and possibly hosted on several processors, each module being entrusted with a specific function.

A first module manages interfacing telematic terminals 10, 12 with access network 11 and takes care of the client registration procedures, the identification procedures and the collection of file bookings. Registration of a new client is a basic step for the use of the system: in effect, during the registration step, a personal "profile", containing personal data, preferences and data necessary for payment of the services requested, such as the data of a credit card or a prepaid card, is associated with the client.

A second module carries out the count and identification of the booked files and manages debiting the client with the cost of the same files, by using the information related with the client's credit card or the prepaid card previously sold to the client by the service operator.

The same module moreover manages communication, through private network 13, with authorities $6_1 \ldots 6_n$ owning the copyrights related with the files booked, for instance by generating a report for the payment of the corresponding copyright fees.

A third module is on the contrary entrusted with communication with distribution points 8 and with store 4, to check for the presence of the booked files (that, in effect, could already be present in the cache memory of distribution point 8), and to manage the file transfer from store 4 to the distribution point concerned.

Acquisition network 9, access network 11, private network 13 and distribution network 14 have been shown as separate logic networks, but they could be implemented by one or more physical networks.

The distribution system previously described is wholly transparent to the kind of material that can be distributed and that is generally referred to as "files".

Therefore the formats only affect the architectural parameters that have been used and not the result, which is always and only the distribution from a central store 4 to a production terminal 8 for direct recording onto a digital support 16.

The kind of support 16 often is determined by the kind of the requested data: If for instance the store in which the selection and the service have been carried out contains a set of records made available in CD format, the CD will be the process output. The same will occur in the case of DVD, SACD, and other formats.

The above-described system ensures copyright safeguard and protection of the contents being transmitted. Actually, only the manager, represented by central processor 2, is responsible for service provision.

To ensure copyright safeguard, right owning authority 6 is equipped with a software module, which carries out a dialogue with a corresponding module installed at the central processor 2 of the service operator.

Such modules exploit the technology conforming to Recommendation X509 (release 3 or higher) for the transmission channel protection (ciphering), the electronic signature and the non-rejection of the transaction through the mutual identification of the interacting subjects/objects. To this end the system uses the Public Key Infrastructure (PKI) architecture, enabling the recognition of own Certification Authorities (CAs) for the whole of its clients and distributors, or of any other CA recognition of which has been agreed to by the parties by virtue of a contract.

Copyright fee accounting is based on the requests contained in the order, upon acknowledgement by the client of the correctness and completeness of the list of requested material.

The software entrusted with accounting and attributing the copyright fees must be certified by the right owning authority 6, which has access to the source code. Compilation for transformation into an executable code will be carried out in the presence or under the direct control of owner 6. The executable code will be associated with a unique string (referred to as "fingerprint") by applying hashing algorithms with digest capability (i.e. the capability of generating strings with predetermined lengths that represent a digest of the original message and have a particularly low repetition probability, of the order of $10^{-15}$, in case of a variation of the original contents; for instance, a system presently used is named MD5).

The above measure prevents the system manager from modifying or even replacing the software module entrusted with copyright fee accounting.

Moreover, for each set of files the copyrights of which can be attributed to a single owning authority 6, an identification code (rights certificate) is generated comprising: a manager identification code, a buy ticket of the produced set, and identification codes of the individual products concerning owning authority 6.

The certificate will be digitally signed by authority 6 and stored by authority 6 and by manager 2, and will be supplied to the client together with the product that has been prepared.

Figure 3:
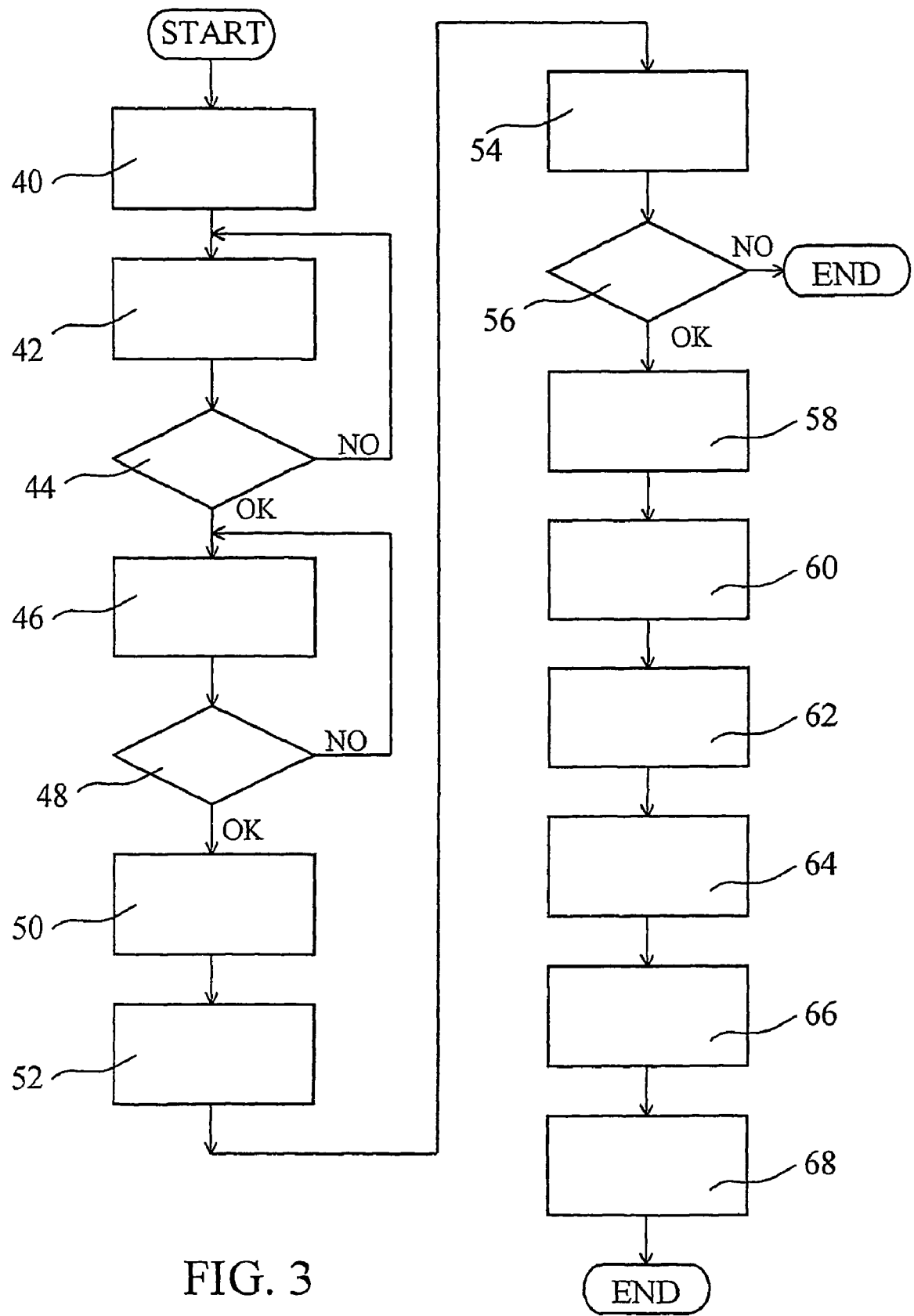
FIG. 3 is a flow chart showing the distribution process implemented in accordance with the present invention.

File booking and distribution takes place according to the following process, shown in detail in the flow chart of FIG. 3. The numbers associated with the operations listed hereinafter correspond with the reference numerals allotted to the blocks shown in FIG. 3.

40—The client gains access, as disclosed above, to the module in central processor 2 that carries out the client recognition and profile allotment; the system obtains from the profile also the usual client's location.

42—The client chooses the material by using a catalogue-like form; if the terminal employed allows so (for instance, by means of a web navigation program) the client may effect a pre-listening or a preview of the material chosen, by taking from store 4 a portion of the files chosen, in compressed format and of reduced quality. While the client is looking at the catalogue and is choosing the material, the system supplies the client with a display, in digital or graphical format, of the space needed by the files chosen, and the total file cost; moreover in this step the system carries out on the requested files base processing, if any, that can be related with the production step (e.g. volume normalisation and adjustments of the dynamic range).

44—The client is asked to check the composition of the order and to accept it in order the operations can go on.

46—The client chooses the production support.

48—A check is made on whether the support is suited to the requested material.

50—Distribution point 8 is identified, i.e. the optimum production point in respect of the automatically computed client's location, by relating the location with the map of the distribution points in the area; taking into account that the client's location may vary (especially if access systems characterised by a high mobility are used, such as a WAP cellular phone), the process will request a confirmation of the determination of the client's access point, before carrying out the computation required for the choice of the distribution point. If the cellular telephone systems allow so, the datum being proposed could also take into account the position dynamically obtained by the cellular network.

52—Production time is evaluated. The evaluation is strictly related with the following basic parameters: size of the original data, time needed for possible format conversion, size of the data to be transferred, ciphering time for channel protection, rate on the channel connecting the manager and the distribution point, decoding time of the protection ciphering, production queue at the devices installed at the distribution point, and speed of the production device. Each of the above parameters is known to the system thanks to the knowledge of store 4 and of the data stored therein, the knowledge of the topology of the network connecting the manager and the distribution point, the knowledge of the algorithms for ciphering at the data transmission end and decoding at the data reception end, and the knowledge of the technical features of the production devices, for instance a masteriser.

54—A preliminary dialogue is carried out between manager 2 and distribution point 8 to communicate the list and the features of the material to be produced and to perform a check on the local availability of copies (in cache memory 22) and on the production queues present on the chosen device.

56—The final acceptance of the order by the client is checked; in the negative, the process stops.

58—A unique buy ticket is generated and is delivered to the client (through different procedures depending on the access terminal: direct print, SMS message, and so on), by associating it to the whole of the material ordered to the distribution point.

60—The cost of the service is charged by using the mechanism associated with the client profile (credit card or prepaid card).

62—The manager contacts the distribution point, through software modules and protocols based on suitably developed IP network standards, by sending the list (directory) of the material to be produced; in case the material is not available at the distribution point, it is accounted and taken from store 4; if part or all of the data, because of the caching optimisation carried out by the system, are already present at the distribution point, the presence of the cached material will be simply signalled and the missing material will be sent.

64—Upon the complete availability of the whole set of material, the software in distribution point 8 will confirm the acceptance of the delivery and will schedule the production of the requested contents on support 16. The contents will be a true copy of the original items, if the client has requested no production processing; otherwise such contents will be the copy resulting from the requested processing. In any case no addition will take place of external information or processing that is not defined by the interface application for material selection used by the client.

66—Production comprises printing a label 30, associated with support 16 and containing at least a copy of the buy ticket, guaranteeing the material collection to the client, and the list of the files or pieces contained in the support.

68—The manager, upon receiving the confirmation from the distribution point, will inform the right owning authority or authorities $6_1 \ldots 6_n$, via the telematic network and by adopting the software architecture described above, of each item concerning the authority or authorities themselves; the manager will receive from the authority or authorities the signed codes referred to hereinabove as "rights certificates"; such certificates will be stored by the same authority 6 and by manager 2 (in the file of the transactions carried out) and sent to production point 8 to supplement the label of the produced material by associating the certificates to the buy ticket of the set of produced material.

The invention claimed is:

1. A system for distributing files containing digital data, by using a telematic network, comprising:
   at least one store, connected to said telematic network and storing a plurality of said files;
   a plurality of distribution points ($8_1 \ldots 8_n$), connected to said telematic network and comprising each means for receiving one or more files from said at least one store and storing them into a local buffer, and means for recording said one or more files onto a suitable support;

at least one telematic terminal, connected to said telematic network, for the choice and the booking by a client of one or more files present in said at least one store, wherein said at least one telematic terminal is a mobile terminal;

a central processor, connected to said telematic network, and comprising means for collceting the bookings coming from said at least one telematic terminal, means for counting and identifying the booked files, means for debiting the client with the cost associated with the booked files, means for generating a copyright fee report for the payment of copyright fees to an authority ($6_1 \ldots 6_n$) owning such rights, and means for transferring said one or more files from said at least one store to at least one of said distribution points, wherein said plurality of distribution points are operated under the control of said central processor, and each include:

enabling means enabling its operation upon reception of a unique identification code from said central processor; and a local buffer for storing at least the files that are more frequently requested at that distribution point, wherein each of said plurality of distribution points is slaved to the central processor for distributing files downloaded from a store and files already existing in the respective local buffer, and wherein a single optimum distribution point, among said plurality of distribution points, is automatically calculated on the basis of a current location of the telematic terminal.

2. A system according to claim 1, wherein said telematic network is an internet/intranet network.

3. A system according to claim 1, wherein said mobile terminal is equipped with WAP, I, IMTS or similar facilities.

4. A system according to claim 1, wherein said at least one telematic terminal comprises means for taking at least one portion of a file from said at least one store, to allow a pre-listening or a preview to the client.

5. A system according to claim 1, wherein said at least one telematic terminal comprises means capable of displaying a list of chosen files, and means for computing and displaying the residual space on said support and the overall cost of the chosen files.

6. A system according to claim 1, wherein said at least one telematic terminal is located at one of said distribution points.

7. A system according to claim 1, wherein said plurality of distribution points is connected with said central processor through a broadband telematic link.

8. A system according to claim 7, wherein said broadband telematic link is a satellite link.

9. A system according to claim 7, wherein said broadband telematic link is an optical fibre link.

10. A system according to claim 1, wherein said one or more files are transferred from said at least one store to a corresponding distribution point in compressed digital form.

11. A system according to claim 1, wherein said at least one telematic terminal allows choosing the kind of support used for recording.

12. A system according to claim 1, wherein said at least one distribution point further comprises means for printing images and/or texts containing information concerning said one or more files chosen, for personalizing said support.

13. A system according to claim 1, wherein said means for generating a report for the payment of the relevant copyright fees to the authority ($6_1 \ldots 6_n$) owning such rights generate a unique identification code which is sent to the distribution point and is subsequently recorded or printed onto the support, said unique identification code identifying said means for generating said report.

14. A system according to claim 1, wherein the transfer of a file from said at least one store to a corresponding distribution point takes place in encoded form, by using a different encoding key for each distribution point, so that only one or a few distribution points can decode said file and store it onto the corresponding support.

15. A system according to claim 14, wherein said files are music pieces and said support is a compact disc.

16. A system according to claim 1, wherein the current location of the telematic terminal is identified on a map of the plurality of distribution points.

17. A system according to claim 3, wherein the current location of the telematic terminal is dynamically obtained by a cellular network.

* * * * *